June 13, 1933.   J. MERSCH   1,913,556
AIRCRAFT
Filed Aug. 30, 1932   4 Sheets-Sheet 4
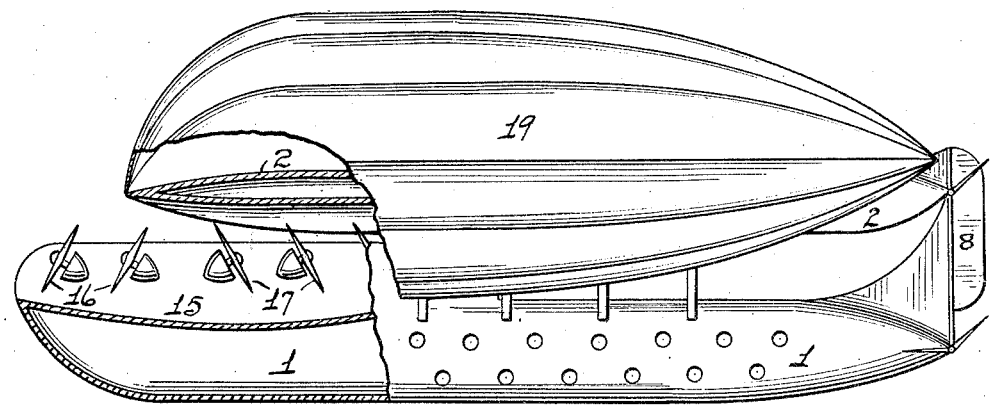
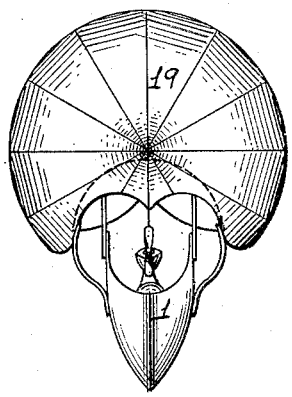
INVENTOR
Jacob Mersch
BY
ATTORNEY Patented June 13, 1933

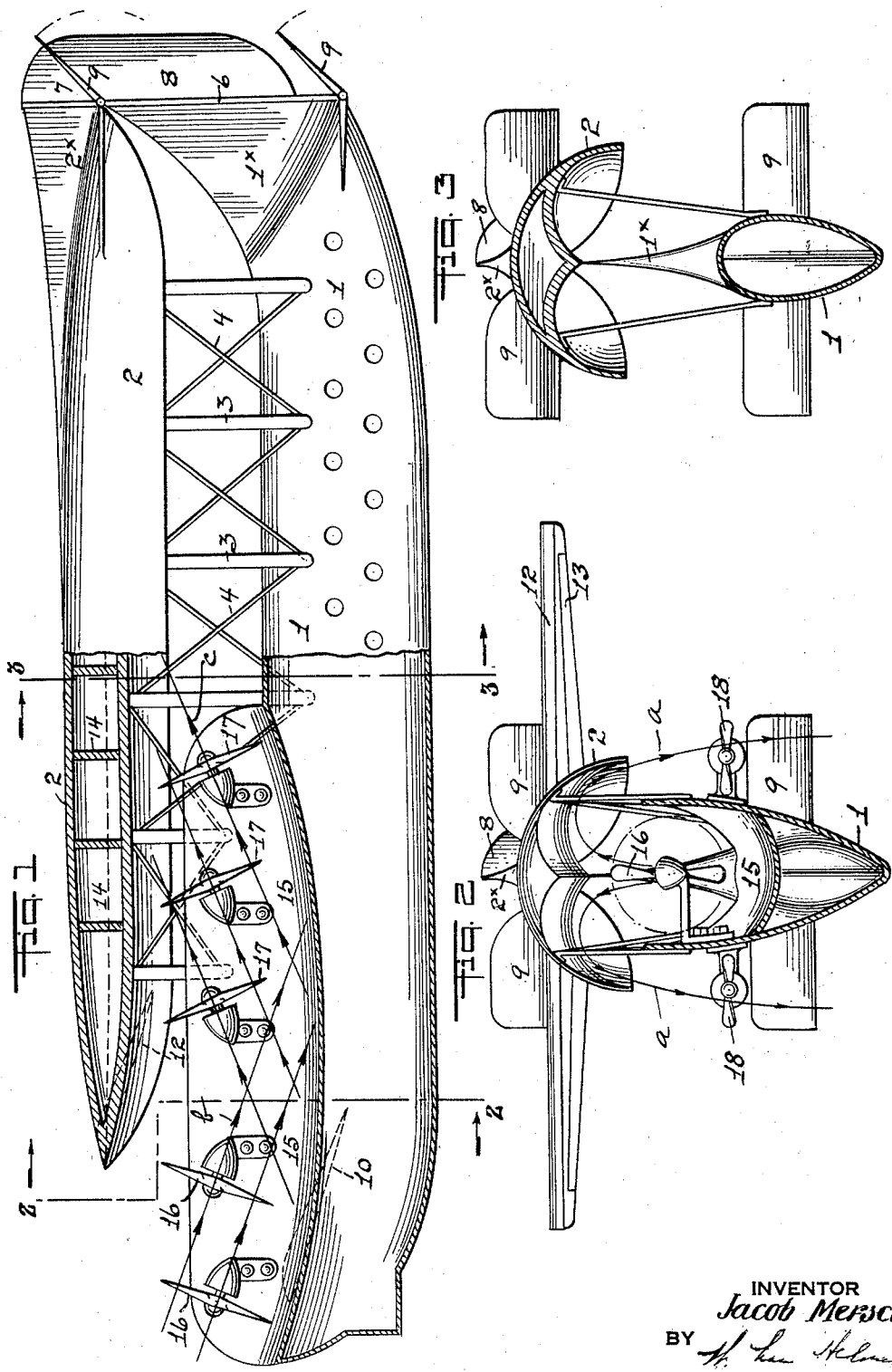

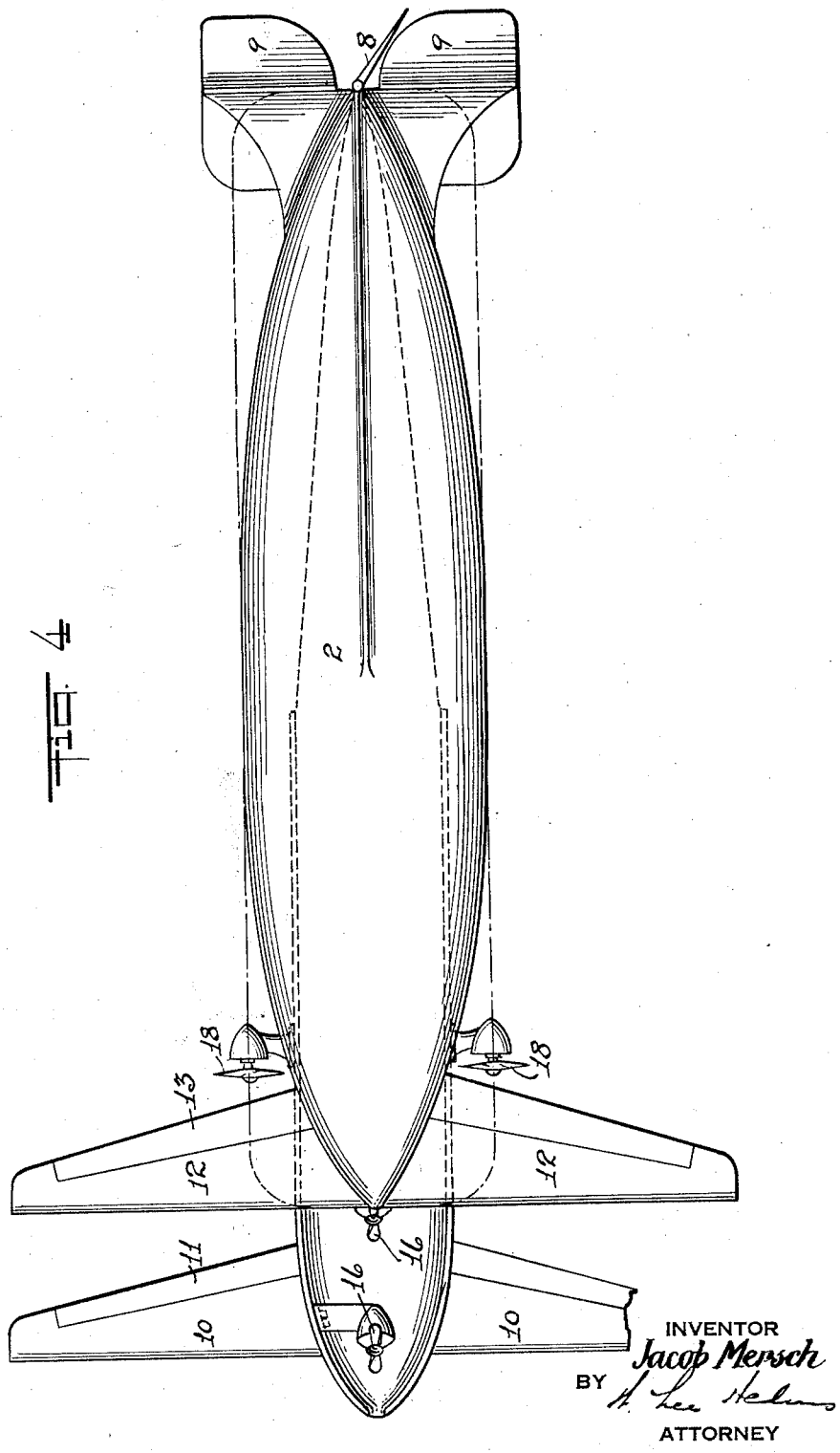

1,913,556

UNITED STATES PATENT OFFICE

JACOB MERSCH, OF JERSEY CITY, NEW JERSEY

AIRCRAFT

Application filed August 30, 1932. Serial No. 631,029.

The object of the present invention is to provide an aircraft of unusual stability and safety, the fuselage being in the form of a relatively long body provided with propelling and air current-directing means so arranged that the air stream from the propellers effects a vertical lift upon the fuselage, the lifting effect always remaining perpendicular with the axis of the fuselage whether the latter is in horizontal position, or tilted nose down, or up. Also, when the fuselage rolls sideways either through banking or from the effect of lateral gusts, counter-tilting forces are imposed upon the aircraft, the fuselage being so arranged with respect to the propellers and air current controlling means, that the lower part of the fuselage, by gravity, will tend to swing to normal position while the upper part of the fuselage, supporting the air controlling means, will actually assist rather than retard the counter tilting of the ship to a normal keel.

A further object of the invention is to provide a relatively long and narrow fuselage with an air suction canal built on the top of the freight and passenger carrying area of the fuselage, the canal being open at the top and at both ends, in combination with a longitudinally extending wind tunnel mounted above the suction canal and open from the bottom and at its ends.

A further object of the invention is to provide, in combination with the air suction canal and wind tunnel, a series of propellers disposed in the suction canal and so arranged that the air stream therefrom proceeds in a zig-zag path to effect a perpendicular lift upon the wind tunnel, and hence, upon the aircraft.

A further object of the invention is to provide adjustment for the propellers so that the zig-zag path of the airstream may be varied for greater lift and less forward speed, or, less lift and greater forward speed, as desired.

A further object of the invention is to combine the aircraft structure having the characteristics above outlined with bouyancy means which make the aircraft lighter than air, the buoyancy means being disposed above the wind tunnel, or the buoyancy may support part of the weight.

The invention will be described with reference to the accompanying drawings in which Fig. 1 is a side elevation, partly in section, of an embodiment of the invention.

Fig. 2 is an end elevation, partly in section, on the line 2—2, Fig. 1.

Fig. 3 is a transverse section on the line 3—3, Fig. 1.

Fig. 4 is a plan view of the aircraft.

Fig. 8 is a side elevation, partly broken away, of an embodiment of the invention, associated with bouyancy means for rendering the aircraft either lighter than air, or, rendering it a semi-dirigible.

Fig. 9 is a front elevation of the same, omitting horizontal stabilizers.

Figure 5:
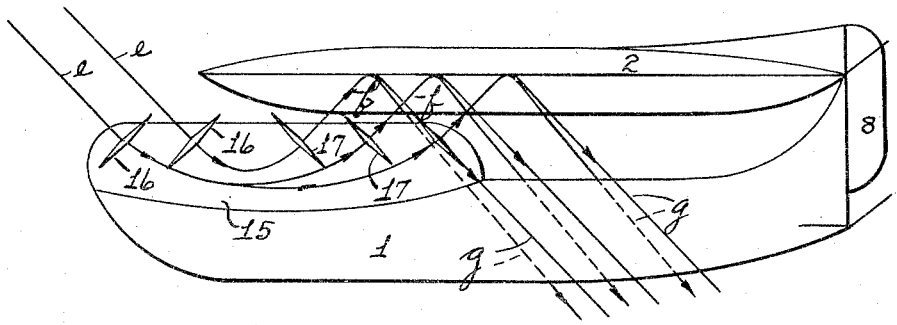
Figs. 5, 6 and 7 are diagrammatic views in elevation showing the direction of the air stream to and from the propellers in various positions thereof.

Referring to Figs. 1, 2 and 3 of the drawings, I have shown therein, an aircraft having a relatively narrow and relatively long formation and incorporating a lower fuselage proper and an overhanging wind tunnel which is best seen in Fig. 4, as cigar-shaped in general formation.

The fuselage is preferably formed of greater depth than width, and of gradually reduced width toward the rear end thereof. In the drawings, I have indicated the fuselage 1 and the wind tunnel at 2, the latter being connected to the fuselage by means of vertical struts 3 and the cross tie members 4.

At its rear, the fuselage is provided with an upwardly extending fin $1x$ reinforced by a vertical strut 6 which is connected with a similar vertical strut 7 carried by an upward extending fin-like member $2x$ of the wind tunnel 2.

Struts 6 and 7 may have pivotally mounted thereon a vertical rudder 8 and one or more horizontal rudders 9.

The fuselage may be provided with a stabilizing fin disposed near its front end as shown at 10, fin 10 being provided with controlling ailerons 11. Likewise, the wind tunnel 2 may carry a stabilizing fin 12 having controlling ailerons 13.

In the present embodiment, the wind tunnel is formed as a hollow body, the interior of which is reinforced by the members 14 and the wall of the wind tunnel centrally and longitudinally thereof is of major depth, the lower wall of the tunnel at each side of its central longitudinal line being curved to a point where at the end of the wall it extends beyond the fuselage 1 substantially, so that the air stream in its lateral movement passing from the wind tunnel is discharged laterally of fuselage 1 as indicated by the arrows $a$, Fig. 2.

Carried forwardly of the longitudinal center of fuselage 1, and at, or near, the top thereof, is a wind canal 15 having a curved bottom and open at its top and ends. Within the wind canal, I have shown two sets of propellers, the propellers 16 comprising one set and the propellers 17 the second set. In practice, the propellers may be reversely inclined and fixed in position as indicated in Fig. 1, or, they may be bodily adjustable so that their angles relatively to each other and their angular position relatively to the wind tunnel, may be varied.

In the position of the propellers as shown in Fig. 1, sets of propellers 16 pull the air currents downwardly, thus tending to raise the nose of the ship, and the propellers 17 receive the thus downwardly directed airstream and carry it from the direction shown by the arrows $b$ to the direction shown by the arrows $c$. In other words, the downwardly directed airstream is carried upwardly by the propeller 17 and is thrown upon the lower wall of the wind tunnel 2. The result is that the airstream thrown downwardly by propellers 16 in exerting a force tending to pull the ship upwardly at the nose is prevented from any substantial neutralization by counter air pressure upon the base of the wind canal because the propellers 17 receive said downwardly directed air currents and immediately throw them upwardly against the base of the wind tunnel and cause them to exert a lift to the ship.

If desired, propellers may be placed laterally of the fuselage as shown at 18.

Figure 6:
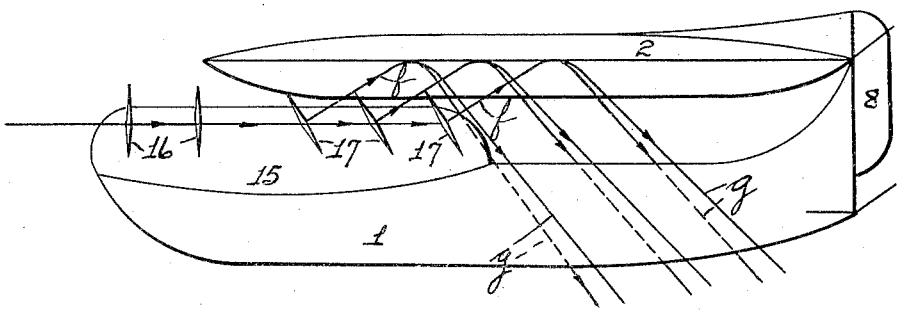
Figure 7:
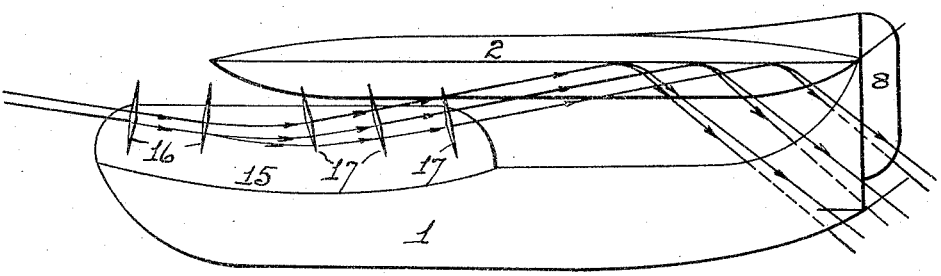

In Figs. 5 to 7, inclusive, I have shown the direction of the airstream drawn in by the foremost propellers of the ship and affected by the position of those propellers, and the second set of propellers in various positions.

In Fig. 5, the second set of propellers 17 are at a sharper angle than in the arrangement shown in Fig. 1 and the direction of the airstream thrown upwardly by propellers 17, against the surface of the wind tunnel, is nearer the perpendicular. The line $e$ shows that the propellers 16 throw the airstream toward the base of the wind canal, but the airstream is immediately taken up by the propellers 17 and thrown against the undersurface of the wind tunnel, shown by the lines $f$, the direction of the downward reaction being indicated by the lines $g$ which extend to both sides of the fuselage due to the reverse curved direction of the wind tunnel as shown in Figs. 2 and 3.

In the arrangement shown in Fig. 5, there is substantial lift with reduced forward propulsion.

In the arrangement shown in Fig. 6 there is greater forward propulsion due to the fact that the first set of propellers 16 are arranged so that their axes are more nearly horizontal and the airstream is thrown rearwardly in substantially a horizontal line to be received by the propellers 17 and thence, acted upon in the same manner as shown in Fig. 5.

In Fig. 7, it will be noted that when the propellers 17 move with their axes more closely approaching the horizontal than in the preceding figures, the airstream received from propellers 16 will be thrown upon the undersurface of the wind tunnel toward the rear thereof, exerting the major lift at this point.

In Figs. 8 and 9, I have shown a buoyancy envelope 19 secured to the ship as by the wind tunnel 2. When the buoyancy chambers of the member 19 are filled, the ship may be operated as a lighter than air aircraft and the propellers at 16 and 17 may be adjusted accordingly. That is to say, they may be used entirely for propulsion rather than lifting. Or, the area and character of the buoyancy envelope 19 may be such that the ship remains a heavier than air ship but part, in proportion, as desired, of its weight will be lifted by the gas contained in the buoyancy envelope 19. The buoyancy envelope may be of any desired form, one operative form, substantially cigar shaped, being shown in the drawings. It is unnecessary that the envelope project downwardly at the sides of the wind tunnel, but I have shown the envelope so formed in order that a more symmetrical construction may be provided.

In the operation of the aircraft, the angle of the sets of propellers 16 and 17 may be initially adjusted to give the ship the greatest lift upon the take-off and until the ship reaches a desired altitude. A desirable relative adjustment of the sets of propellers for this purpose is shown in Fig. 5.

As the ship reaches or approaches the desired altitude, the angle of the propellers may be changed to reduce the lifting thrust of the airstream from the propellers, the velocity of the ship requiring less lift from the propelled airstream due to the action of the air entering the wind tunnel at the front end thereof and bearing against its undersurface and the action of the air upon the stabilizing fins. Thus, the change in adjustment of the propellers may be from that shown in Fig. 5 to that shown in Fig. 6, as the ship increases its altitude and finally the propellers may be adjusted to the position shown in Fig. 7, or to such position that the ship reaches its greatest speed while maintaining the desired altitude.

In landing the ship the sets of propellers will be adjusted to give the ship the desired downwardly inclined path, and at the desired speed, it being understood that preceding actual landing of the ship, the propellers will be adjusted to give the ship such lift as to reduce the speed to the minimum or to that desired. For example, immediately preceding actual landing, say, when the ship is five hundred feet above the ground, the propellers may be adjusted to the position illustrated in Fig. 5, or thereabouts, and the landing effected by reducing the speed of rotation of the propellers.

It will be noted that I have shown a larger number of propellers 17 than the foremost propellers 16, because I prefer that the action upon the airstream by propellers 17 be greater than the action upon that airstream by propellers 16. However, it is unnecessary that a greater number of propellers 17 be used because the same result may be obtained by employing a greater number of blades or a larger blade area, or higher speed. By imposing upon the airstream drawn in by propellers 16 a greater suctional force than exerted by said propellers, the airstream from the propellers is not thrown upon the lower wall, of the wind canal but is thrown rearwardly and upwardly against the undersurface of the wind tunnel. The ship thus has the entire lift exerted by the forward propulsion of the propellers plus the entire lift exerted by the rearward propellers, plus the forward or propeller force resulting from the indrawing of the airstream at the front of the plane and its discharge in directions laterally of the ship and rearwardly thereof, as shown by the diagrammatic Figs. 5 to 7 inclusive.

Referring to Fig. 4 and the ailerons carried by fins 10 and 12, it will be noted that each fin has an aileron at each side of the fuselage proper or wind tunnel, as the case may be; in practice, means will be provided for operating the ailerons of each fin in such manner that one may be raised simultaneously with an equivalent lowering of the other in accordance with the airplane practice, as will be understood by those skilled in the art.

Having described my invention, what I claim and desire to secure by Letters Patent, is as follows:—

1. In an aircraft, a relatively long and narrow fuselage having a freight and passenger carrying area, an air suction canal carried by the fuselage near the top thereof, the canal being open at its top and at both ends, in combination with a longitudinally extending wind tunnel mounted above the suction canal and open from the bottom and at its ends.

2. In an aircraft, a relatively long and narrow fuselage, an air suction canal carried by the fuselage near its top, the canal being open at both ends and at the top, propelling means carried within the canal, and a longitudinally extending wind tunnel carried above the canal and open from the bottom and at its ends.

3. In an aircraft, a fuselage, an air suction canal carried near the top of the fuselage and having an inlet and an outlet extending longitudinally of the fuselage, and an open top, a wind tunnel mounted above the suction canal and open from the bottom and at its ends, propelling means adapted to draw an air stream into the canal, and propelling means disposed to receive said air stream and direct it upwardly against the lower wall of the wind tunnel.

4. An aircraft constructed in accordance with claim 3 in which the two propelling means are independently adjustable to vary the direction of intake of the airstream and the direction of upward throw thereof.

5. In an aircraft, a relatively long and narrow fuselage having a freight and passenger carrying area, an air suction canal carried by the fuselage, propelling means in said air suction canal and a wind tunnel overhanging the air suction canal and extending at each side beyond the side of the fuselage, the canal being open at the bottom and at both ends and adapted to receive airstream from said propelling means and to direct the airstream laterally of the fuselage.

6. In an aircraft, a relatively long and narrow fuselage, an air suction canal carried by the fuselage, propelling means within the air suction canal, a wind tunnel mounted above the air suction canal and adapted to receive airstream from said propelling means, the wind tunnel having a relatively long and narrow body and the body being formed with a lower curved wall overhanging and extending laterally beyond the fuselage.

7. An aircraft constructed in accordance with claim 6 in which the bottom of the wind tunnel is formed with a double curvature forming two channels extending longitudinally thereof.

8. An aircraft comprising a fuselage, an air suction canal carried by the fuselage, a wind tunnel carried above the fuselage, maneuvering and stabilizing means carried by the aircraft, and propellers disposed within the suction canal and adapted to direct the airstream into and out of the suction canal in a zig-zag path, as and for the purpose described.

9. An aircraft constructed in accordance with claim 8 in which the propelling means is adjustable to vary the zig-zag path of the airstream.

10. In an aircraft, a relatively long and narrow fuselage, air suction canal carried by the fuselage near the top thereof, a relatively long and narrow wind tunnel carried by the fuselage above the suction canal and open at the bottom and at its ends, propelling means disposed within the suction canal, laterally extending stabilizing fins carried by the fuselage near the front end thereof, ailerons carried by said fins, and vertical and horizontal rudders carried at the rear end of the fuselage.

11. An airship constructed in accordance with claim 10 in combination with stabilizing fins carried at the front end of the wind tunnel.

In testimony whereof, I have signed my name to this specification.

JACOB MERSCH.